Jan. 28, 1969  G. S. KITSON ETAL  3,424,383
JET NOZZLE
Filed Oct. 3, 1966
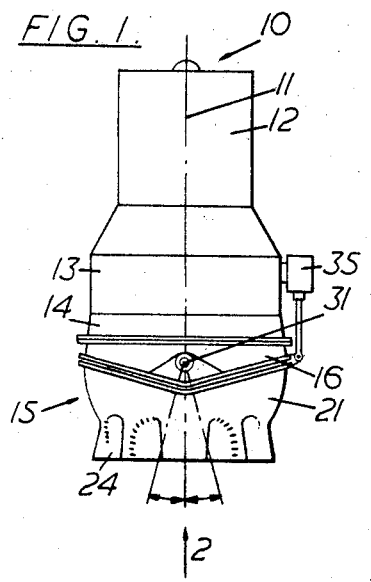
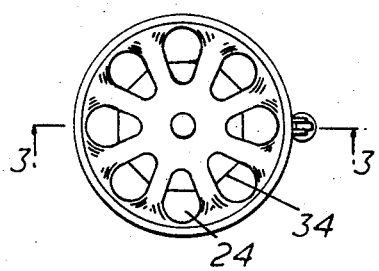
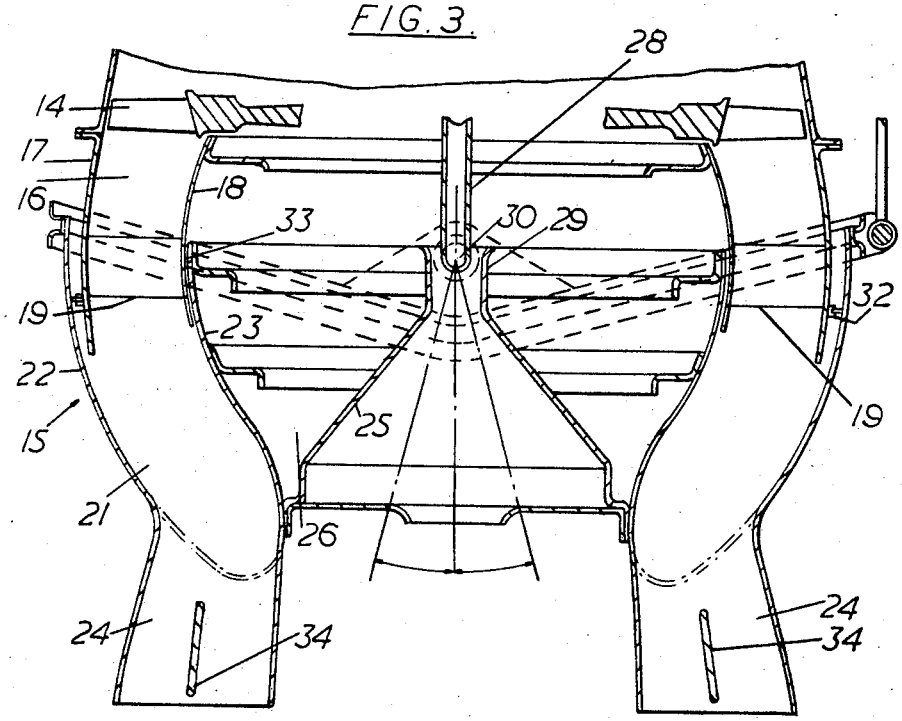

3,424,383
JET NOZZLE
George Samuel Kitson, Aspley, Nottingham, and Roger Anthony Cresswell, Derby, England, assignors to Rolls-Royce Limited, Derby, England, a British company
Filed Oct. 3, 1966, Ser. No. 583,571
Claims priority, application Great Britain, Oct. 22, 1965, 44,944/65
U.S. Cl. 239—265.35    7 Claims
Int. Cl. B64c 15/04

ABSTRACT OF THE DISCLOSURE

A jet nozzle comprising an annular fixed duct inside which is fitted an annular swivelling duct, jet gases passing through both ducts. At the discharge end of the swivelling duct are several nozzle members and through these members the jet gases are directed to the atmosphere. Jet gases are allowed to pass to a space internally of the inner wall of the annular swivelling duct so as to assist in pressure balancing of the inner wall and prevent it from bursting.

---

This invention concerns a jet nozzle.

According to the present invention, there is provided a jet nozzle comprising a fixed duct member which is adapted to receive jet gases, and a swivelling duct member which is mounted for swivelling movement with respect to the fixed duct member, the swivelling duct member having an upstream end which is adapted to receive jet gases from the fixed duct member and a downstream end which communicates with a plurality of angularly spaced apart nozzle members through which the jet gases may be directed to atmosphere.

The fixed duct member and the swivelling duct member are preferably annular members which fit one into the other.

Means are preferably provided for permitting jet gases to pass to a space disposed internally of the inner wall of the annular swivelling duct member so as to assist in pressure balancing the said inner wall. Thus an annular gap may be provided between the inner walls of the fixed and swivelling annular duct members, the said annular gap communicating with the said space. The downstream end of the said space may be sealed from atmosphere by a conical fairing which is attached to the inner wall of the annular swivelling duct member.

The outer walls of the fixed and swiveling annular duct members are preferably sealed to each other.

Preferably, the swivelling duct member and the nozzle members respectively converge and diverge towards their downstream ends.

Each nozzle member may have at least one vane mounted therein.

The jet nozzle may be provided with power means for effecting swivelling movement of the swivelling duct member.

The invention also comprises a vertical lift jet engine provided with a jet nozzle as set forth above.

The term "vertical lift jet engine" as used in this specification is to be understood to indicate a jet engine adapted to produce vertical lift forces on an aircraft independently of those generated aerodynamically by forward flight of the aircraft. For this purpose the engine may have a thrust to weight ratio of at least 8:1 and preferably of at least 16:1. The said engine may, moreover, be mounted either vertically or with its longitudinal centre-line at a small angle, e.g. 6°, to the vertical.

The invention is illustrated, merely by way of example, in the accompanying drawings, in which:

FIGURE 1 is a diagrammatic elevation of a vertical lift gas turbine jet engine provided with a jet nozzle in accordance with the present invention, FIGURE 2 is an underneath plan view looking in the direction of the arrow 2 of FIGURE 1, and FIGURE 3 is a broken-away section taken on the line 3—3 of FIGURE 2.

In FIGURE 1, there is shown a vertical lift gas turbine jet engine 10 which may be mounted in an aircraft (not shown) either vertically, as shown in FIGURE 1 or with its longitudinal centre-line 11 at a small angle of, say 6° to the vertical.

The engine 10 comprises in flow series a compressor 12, combustion equipment 13, a turbine 14 and a jet nozzle 15.

The jet nozzle 15 comprises a fixed annular duct member 16 having an outer wall 17 and an inner wall 18, the fixed annular duct member 16 being adapted to receive jet gases which have passed through the turbine 14. The inner wall 18 is supported from the outer wall 17 by a plurality of support struts 19 which also reduce the swirl energy in the jet gases.

The fixed annular duct member 16 is mounted to fit within a swivelling annular duct member 21 whose upstream end is adapted to receive the jet gases from the fixed annular duct member 16. The swivelling annular duct member 21, which has an outer wall 22 and an inner wall 23, communicates at its downstream end with a plurality (e.g. eight) of annularly spaced apart nozzle members 24 through which the jet gases may be directed downwardly to atmosphere.

Secured to the inner wall 23 of the annular swivelling duct member 21 is a conical fairing 25 which defines with the inner wall 23 an annular space 26 which is thus disposed internally of the inner wall 23. The conical fairing 25 has an upstream portion 29 which extends closely adjacent to a pivot axis 30, the pivot axis 30 being that of the annular duct members 16, 21 which are interconnected by means of two externally located diametrically opposed bearings 31 each of which is positioned on the pivot axis 30 so as to permit the duct member 21 to be swivelled with respect to the duct member 16. The upstream portion 30 is formed to receive fuel and oil draining from the engine by way of a duct 28.

The outer walls 17, 22 of the duct members 16, 21 respectively are sealed to each other by a piston ring seal 32. The inner walls 18, 23 of the duct members 16, 21 are, however, separated from each other by an annular gap 33, and this annular gap 33 communicates with the annular space 26. Accordingly, jet gases will pass from the annular swivelling duct member 21 and through the annular gap 33 to the annular space 26 so as to assist in pressure balancing the inner walls 23, 18.

The annular swivelling duct member 21 and the nozzle members 24 respectively converge and diverge towards their downstream ends. Mounted, moreover, in each of the nozzle members 24 is a stabilising vane 34.

A ram 35, which may be operated by compressed air from the compressor 12, is provided to effect swivelling movement of the swivelling duct member 21, e.g. through an angle of 15° to either side of the longitudinal centre line 11. The jet gases directed downwardly through the nozzle members 24 may therefore be given a component of forward or rearward thrust.

The provision of the plurality of nozzle members 24 assists in effecting rapid mixing between the jet gases and the ambient air, and this is desirable both in order to reduce noise and to reduce ground erosion.

We claim:

1. A jet nozzle comprising: an annular fixed duct member for receiving jet gases; an annular swivelling duct member mounted for swivelling movement with respect to said fixed duct member, said annular fixed duct member and said annular swivelling duct member fitting one into the other, and said swivelling duct member having an inner wall, an outer wall and an upstream end arranged to receive jet gases from the fixed duct member; a plurality of angularly spaced apart nozzle members each communicating with the downstream end of the swivelling duct member and through which jet gases may be directed to atmosphere; and means permitting jet gases to pass to a space disposed internally of said inner wall of said annular swivelling duct member so as to assist in pressure balancing said inner wall.

2. A jet nozzle as claimed in claim 1 in which an annular gap is provided between the inner walls of the fixed and swivelling annular duct members, the said annular gap communicating with the said space.

3. A jet nozzle as claimed in claim 1 in which the downstream end of the said space is sealed from atmosphere by a conical fairing which is attached to the inner wall of the annular swivelling duct member.

4. A jet nozzle as claimed in claim 1 in which the outer walls of the fixed and swivelling annular duct members are sealed to each other.

5. A jet nozzle as claimed in claim 1 in which the swivelling duct member and the nozzle members respectively converge and diverge towards their downstream ends.

6. A jet nozzle as claimed in claim 1 in which each nozzle member has at least one vane mounted therein.

7. A jet nozzle as claimed in claim 1 comprising power means for effecting swivelling movement of the swivelling duct member.

References Cited

UNITED STATES PATENTS

| | | | |
|---|---|---|---|
| 2,193,375 | 3/1940 | Papritz. | |
| 2,765,197 | 10/1956 | Chimbole | 239—587 X |
| 2,919,546 | 1/1960 | David | 239—587 X |
| 3,025,667 | 3/1962 | Moorehead | 239—265.35 X |
| 3,048,010 | 8/1962 | Ledwith | 239—265.35 |
| 3,147,591 | 9/1964 | McEwen | 239—265.35 X |
| 3,281,082 | 10/1966 | Kerry | 239—265.35 |

EVERETT W. KIRBY, *Primary Examiner.*

U.S. Cl. X.R.

244—52; 239—265.25